United States Patent [19]
Strader

[11] 3,987,576
[45] Oct. 26, 1976

[54] FISHING LURE

[76] Inventor: James W. Strader, P.O. Box 4029, Tallahassee, Fla. 32303

[22] Filed: May 29, 1975

[21] Appl. No.: 581,823

[52] U.S. Cl. .............................. 43/42.16; 43/42.19; 43/42.31
[51] Int. Cl.² .......................................... A01K 85/00
[58] Field of Search............ 43/42.19, 42.16, 42.17, 43/42.2, 42.21, 42.1, 44.97, 42.31

[56] References Cited
UNITED STATES PATENTS

| | | | |
|---|---|---|---|
| 1,856,043 | 4/1932 | Pflueger | 43/42.19 |
| 2,610,429 | 9/1952 | Thomas | 43/42.17 |
| 2,660,827 | 12/1953 | Pero | 43/42.19 |
| 3,555,717 | 1/1971 | Gautsche, Jr. | 43/42.17 |

FOREIGN PATENTS OR APPLICATIONS

| | | | |
|---|---|---|---|
| 784,644 | 10/1957 | United Kingdom | 43/42.19 |

*Primary Examiner*—Warner H. Camp
*Attorney, Agent, or Firm*—Malin & Haley

[57] ABSTRACT

A fishing lure has an elongated flexible wire shaft having disposed at one end a line connecting eye and a hook at the opposite end. Disposed along the shaft is a lead weight which is conically shaped and which is contained within conical shaped plastic housing which forms a sound chamber, the shaft has a clevis with a spinner attached thereto behind the lead weight, and a plurality of ball shaped bearings on the shaft between the clevis and the covered lead weight. Disposed about the hook is a weed guard which is connected to the hook end and a rubber skirt which disguises the hook. The spinner, attached to the clevis, creates an uneven force around the flexible shaft when the lure is moved through the water which is transmitted along the shaft to the lead weight and the plastic cover causing the lead weight to strike the interior of the cover for generating a sound. The weed guard, skirt and hook revolve slowly from the torque action created by the spinner such that any striking of the skirt by the fish will cause the weed guard to be tripped up away from the point of the hook allowing the fish to become hooked.

3 Claims, 2 Drawing Figures

FISHING LURE

BACKGROUND OF THE INVENTION

This invention relates generally to a fishing lure, and more specifically to an improved fishing lure which provides for weedless operation while including a sound actuating means which cooperates with the entire structure of the device. The lure is characterized by being non-complex in operation and having reduced cost in construction.

One problem that has plagued the use of fishing lures for casting and the like in the past has been that when retrieving or reeling in the lure, the lure oftentimes becomes entangled or encumbered with weeds fouling the hook, an undesirable feature. Also it has been found that certain noises attract fish and some lures have been built with various noise making means. The instant invention comprises and combines the noise making feature with a means to prevent weeds from attaching to the hook while allowing the hook to be freely available for hooking the fish when the fish strikes the device. The device also includes a weight which aids in casting of the lure which is constructed in combination with a hollow cover to provide noise for the attraction of the fish.

BRIEF DESCRIPTION OF THE INVENTION

An improved fishing lure having a wire shaped, metal, elongated body, said body having a pair of eyes coupled at each end, a weight coupled about said body having substantially a conical shape and disposed adjacent the line connecting end of said body, a thin resilient conical cover disposed over said weight having a body portion extended beyond the length of the weight, creating a hollow portion for receiving a plurality of bearings, a clevis mounted on said wire body, a spinner attached to said clevis, a pair of ball-shaped bearings connected to said body and disposed one on each side of said clevis along said body, a hook coupled at the opposite end to one of said eyes, said hook including a moveable weed guard positioned from a first position away from said hook end to a second position adjacent said hook end and a rubber skirt, said rubber skirt comprising a plurality of rubber-like tenacles disposed about said hook. The lure is attached to a swivel to allow the lure to rotate without twisting the line to which it is attached. The lure is principally used with casting and the weight size is adjusted to provide a proper amount of mass for improved casting. The weight is covered by a resilient conical shaped cover which is hollow, with the apex of the conical cover being disposed towards the swivel and the end of the lure attached to the fishing line. The conical shape aids in allowing the lure to freely pass through weeds without attaching thereto. The conical cover over the weight may be made of plastic and includes an extended portion which receives one or more ball-shaped bearings which are fixed about a line into the hollow portions to act as a sounding chamber for creating sound for attracting fish.

In operation, as the lure is being pulled through the water as the lure is being reeled in, the spinner creates a asymmetrical force or torque on the lure itself which being connected to a swivel provides a rotation of the lure. This rotation causes the hook and the hook weed guard to slowly revolve around the longitudinal axis of the lure body. Thus any attempt by a fish to strike the rubber skirt, which is aesthetically designed to attract fish will trip the wire weed guard to a position away from the hook point allowing the hook to engage the fish. The clevis and spinner arrangement also creates an asymmetrical force which vibrates the flexible body of the lure which is transmitted along the wire-like body shaft of the device to the weight and the hollow conical chamber surrounding the weight causing these to vibrate in conjunction with the plurality of ball-shaped bearings which also strike the conical chamber creating a noise or sound which attracts fish. The rotation rate of the lure hook and the vibrational frequency may be controlled by, among other things, the size of the spinner and the clevis coupled to the lure shaft. Thus the instant invention, with the mass provided for casting, which is shielded from weeds while providing a sound or rattle chamber discloses an improved fishing lure or fishing bait which is used to catch fish is easier to cast, has a sound attraction means and is virtually weedless in operation.

It is an object of this invention to provide a improved fishing lure which is substantially weedless in operation.

It is another object of this invention to provide an improved fishing lure which generates sound for the attraction of fish.

And yet still another object of this invention is to provide a fishing lure having an asymmetrical torque and force inducing means which causes the lure to rotate for an improved weedless operation and creation of sound for attracting fish and the like.

In accordance with these and other objects which will be apparent hereinafter, the instant invention will now be described with particular reference to the accompanying drawings.

PREFERRED EMBODIMENT OF THE INVENTION

Figure 1:
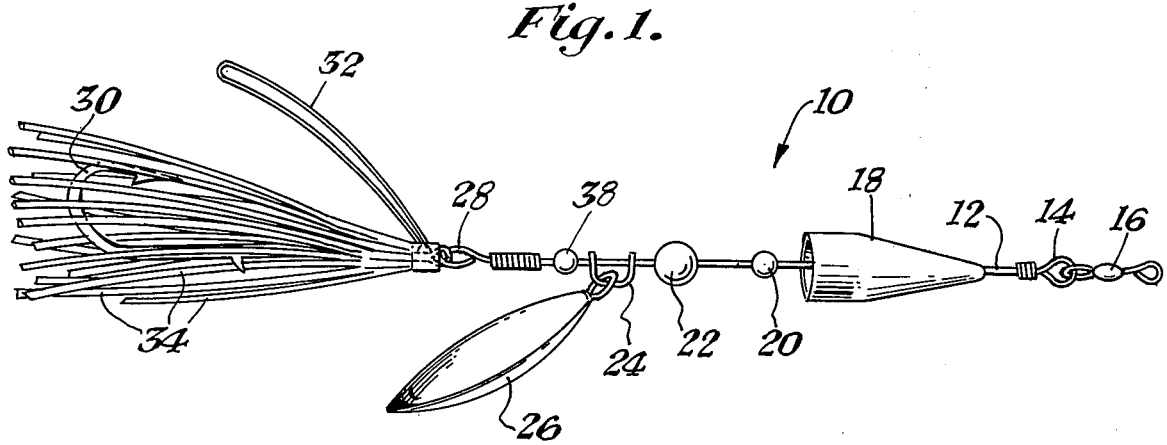
FIG. 1 shows a side elevational view of the instant invention.
Figure 2:
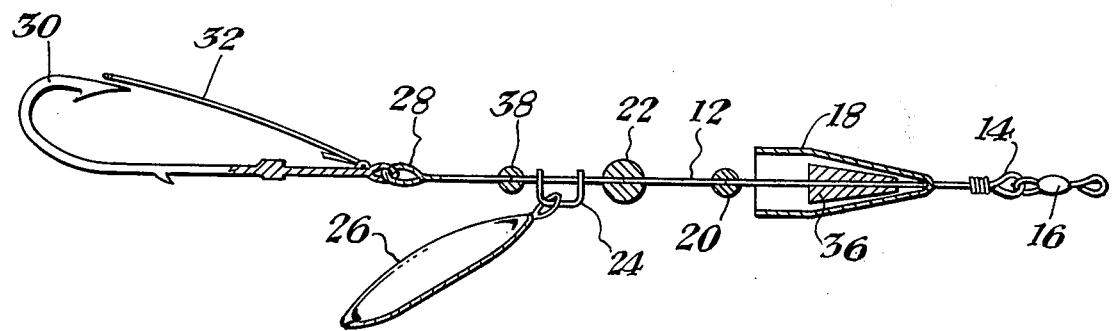
FIG. 2 shows a side view in elevation partly in cross-section of the instant invention.

Referring now to the drawings and especially FIG. 1, the instant invention, an improved fishing lure, is shown generally at 10 comprising a thin wire shaft 12 which constitutes the basic body of the device, the wire shaft being flexible and having disposed at one end an eye 14 which is connected and allows the connection of a swivel 16 which is attached to a conventional fishing line. Also attached to the flexible shaft 12 is a conical, plastic case 18 which is concentrically disposed about the shaft and attached through the apex end. The inside of the conical case 18 is essentially hollow and will be described in more detail below. Also connected to shaft 12 is a clevis 24 having a spinner 26 attached thereto. Disposed on either side of the clevis longitudinally along the shaft are a plurality of ball-shaped bearings which act to keep the clevis 24 from engaging either the end or eye 28 of the lure body or the conical case 18. Connected to eye 28 is a hook 30 having a rubber skirt 34 which includes a plurality of tenacle-like thin flexible pieces of rubber which may be of a particular design or color and are mounted and shaped on said hook and disposed about the hook to provide an artificial type bait to attract fish. Also connected to the hook eye is a weed guard 32, shown in the open position, which acts to prevent weeds from being received and entangled in the hook 30.

Also connected to the wire shaft 12 is a substantially conical-shaped lead weight 36 which is covered by the conical case 18. The weight 36 and the conical shape are not rigidly fixed together but have relative movement which aids in the creation of a sound attracting noise. When the device is being pulled through the water, the spinner 26 creates a torque as it spins about the shaft 12 which tends to rotate the entire shaft body 12 and hook 30 and weed guard 32 to provide rotational movement about the longitudinal axis of the lure. If a fish should strike at the rubber skirt, the rotation of the hook and weed guard insure that when the skirt is struck by the fish, the weed guard will be triggered to the open position, shown in FIG. 1, allowing and exposing the end of the hook so that the fish will engage the end of the hook. An asymmetrical force, because of the spinner 26, also causes the shaft body 12 to vibrate which causes the conical case 18 and weight 36 to rattle or vibrate against each other while bearings 20 and 22 will also engage the conical case and the weight, with the result being a sound which is accentuated by the hollow chamber within case 18, thus providing a sound for the attraction of fish to the lure. The swivel 16 is important to prevent the fishing line itself from being twisted and thus allows the entire lure to rotate without twisting the fishing lure.

Thus, the instant invention provides an improved lure that is essentially weedless in operation, has an improved mass loading or weight for increased casting distance and a torque and force generating means which acts to improve the weedless operation while simultaneously creating sound which is utilized for the attraction of fish.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved fishing lure comprising:
   a thin, elongated, flexible shaft;
   a pair of connectors, one connected at either of the opposite ends of the shaft;
   a swivel means connected to one of the connectors at the forward end of the shaft;
   said swivel means adapted to be attached to a conventional fishing line;
   a shaft asymmetrical torque inducing means connected to said flexible shaft;
   a weight connected around said shaft forward of said asymmetrical torque inducing means;
   weight covering means disposed about said weight for providing a noise maker, said covering means connected around said shaft and including a hollow chamber portion adjacent said weight;
   a plurality of separating means separating said weight and said asymmetrical torque inducing means and movable along said shaft;
   a hook connected to the opposite end of said shaft from said swivel means;
   artificial bait means connected about said hook; and
   a weed guard means connected to said hook and movable from a first position adjacent said hook point to a second position away from said hook point, said weight covering means being so constructed and arranged to act as both a sound chamber and as a weed separator preventing the fouling of the forward portions of the lure.

2. An improved lure, as in claim 1, wherein:
   said asymmetrical torque inducing means includes a clevis attached to said shaft and a spinner connected to said clevis.

3. A fishing lure, as in claim 2, wherein:
   said weight is conically shaped and the hollow chamber of said weight covering means is conically shaped and said separating means includes a plurality of ball-shaped bearings connected to said shaft and disposed on both sides of said clevis, said bearings forward of said asymmetrical torque inducing means being receivable into the open end of said conical shaped housing about said weight.

* * * * *